(12) United States Patent
Lee

(10) Patent No.: US 9,254,775 B2
(45) Date of Patent: Feb. 9, 2016

(54) SYSTEM FOR CONTROLLING TRANSPORT OF HEAVY LOAD, TRANSPORT VEHICLE, AND METHOD OF CONTROLLING TRANSPORT OF HEAVY LOAD

(71) Applicant: DOOSAN HEAVY INDUSTRIES & CONSTRUCTION CO., LTD., Changwon-si, Gyeongsangnam-do (KR)

(72) Inventor: Ki Hak Lee, Daejeon (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 86 days.

(21) Appl. No.: 14/108,785

(22) Filed: Dec. 17, 2013

(65) Prior Publication Data
US 2014/0172244 A1  Jun. 19, 2014

(30) Foreign Application Priority Data

Dec. 17, 2012 (KR) .......................... 10-2012-0147351
Sep. 16, 2013 (KR) .......................... 10-2013-0111335

(51) Int. Cl.
*B60P 3/40* (2006.01)
(52) U.S. Cl.
CPC ........................................ *B60P 3/40* (2013.01)
(58) Field of Classification Search
CPC .......................................................... B60P 3/40
See application file for complete search history.

(56) References Cited

U.S. PATENT DOCUMENTS

| 7,303,365 | B2 * | 12/2007 | Wobben ........................... 410/45 |
| 8,306,695 | B2 * | 11/2012 | Pedersen ........................... 701/38 |
| 8,753,040 | B2 * | 6/2014 | Wu et al. ......................... 405/206 |
| 8,961,085 | B2 * | 2/2015 | Ressel et al. ...................... 410/44 |
| 2009/0087311 | A1 * | 4/2009 | Wyborn ............................. 416/9 |
| 2009/0297287 | A1 | 12/2009 | Entwistle |
| 2010/0168960 | A1 | 7/2010 | Pederson |
| 2010/0316450 | A1 * | 12/2010 | Botwright ...................... 405/206 |
| 2012/0255478 | A1 * | 10/2012 | Hadeler et al. ............. 114/61.31 |

FOREIGN PATENT DOCUMENTS

| JP | 2004-243805 | A1 | 9/2004 |
| KR | 10-0561590 | B1 | 3/2006 |
| KR | 1020110045344 | A | 5/2011 |
| WO | 2011/124574 | A1 | 10/2011 |

* cited by examiner

*Primary Examiner* — James Trammell
*Assistant Examiner* — James E Stroud
(74) *Attorney, Agent, or Firm* — Sughrue Mion, PLLC

(57) ABSTRACT

Provided is an apparatus for controlling transport of a heavy load by which a transport vehicle smoothly transports a heavy load such as a rotor blade of a wind power generator, which has a high weight and a large length, without collisions or interferences by controlling movement of the heavy load according to a facility around a road or a peripheral environmental condition in a process of transporting the heavy load on the road with the transport vehicle, a transport vehicle, and a method of controlling transport of a heavy load. The apparatus includes: an adjusting unit configured to control rotation or movements of the heavy load so that collision or interference of the heavy load with a facility around a road or a peripheral environmental condition is prevented in a process of transporting the heavy load after the heavy load is fixedly mounted to the adjusting unit.

20 Claims, 14 Drawing Sheets

(a)

(b)

SYSTEM FOR CONTROLLING TRANSPORT OF HEAVY LOAD, TRANSPORT VEHICLE, AND METHOD OF CONTROLLING TRANSPORT OF HEAVY LOAD

CROSS-REFERENCE TO RELATED APPLICATION(S)

This application claims the benefit of priority from Korean Patent Applications 10-2012-0147351 filed on Dec. 17, 2012 in the Korean Intellectual Property Office, and Korean Patent Application 10-2013-0111335, filed on Sep. 16, 2013 in the Korean Intellectual Property Office, the disclosures of which are incorporated herein by reference in their entirety.

BACKGROUND

1. Field

Apparatuses consistent with exemplary embodiments relate to an apparatus for controlling transport of a heavy load on a transport vehicle, and a method of controlling transport of a heavy load, and more particularly to an apparatus and a method for controlling transport of a heavy load where a transport vehicle can smoothly transport the heavy load such as a rotor blade of a wind power generator, which has a high weight and a large length, without collisions or interferences by controlling movement of the heavy load according to a facility around a road or a peripheral environmental condition in a process of transporting the heavy load on the road with the transport vehicle.

2. Description of the Related Art

In the related art, a wind power generator refers to a power generation apparatus which converts a kinetic energy of wind into electrical energy by rotating a plurality of rotor blades. The wind power generator is installed at a site where high-quality wind power resources exist. That is, there are no buildings or trees higher than wind generation equipment which will likely interfere with a high speed wind, and there are no inhabitants or businesses that can be influenced in the case when a wind power tower falls down.

Thus, the wind power generator is installed in the mountains or the ocean-side that is far from dwelling sites, and a rotor blade of the wind power generator has a length of several to several tens of meters to maximally utilize the wind power resources. The rotor blade is not directly manufactured in the installation site, but is manufactured at a separate manufacturing site which is remotely located from the installation site and is transported to the installation site by a specialized vehicle so as to be assembled in the installation site.

In order to transport the rotor blade, it is very important to identify information on a peripheral environmental condition such as a road situation, a slope of a road, a radius of rotation of the road, a facility around the road, a bridge, and a tunnel to determine whether the vehicle can pass through the road.

An example of such a technology is disclosed in Korean Patent No. 10-0561590 (hereinafter, referred to as 'prior document 1') entitled "Transport Vehicle for Rotor Blade of Wind Power Turbine". Prior document 1 provides a transport vehicle for a rotor blade of a wind power generator in which a traction truck and a trailer are connected to each other by a rotor blade during the transport of the rotor blade, and the traction truck and trailer have a holding unit and/or an accommodation unit for the rotor blade. The rotor blade can be rotated about an axis and a driving unit for rotation of the rotor blade is provided in the traction truck and/or the trailer.

U.S. Patent Application Publication No. 2010-0168960 (hereinafter, referred to as 'prior document 2') discloses a transport vehicle that transports a turbine blade. The transport vehicle includes a blade connection apparatus including a tilting unit to connect an end of a blade to the transport vehicle. An end of the blade faces a front side of the transport vehicle.

However, according to the technology of prior document 1, since a body of the rotor blade is rotated to pass through a lower side of a bridge and the like, the rotor blade cannot be rotated in a height-wise direction and a widthwise direction thereof, that is, the rotor blade cannot be moved upward, downward, leftward, and rightward, so it is difficult to utilize the technology in a condition in which many facilities exist around a road.

Further, according to the technology of prior document 2, although a turbine blade is erected by using a tilting unit after reaching a final destination, it may collide or interfere with facilities around a road during transport of the turbine blade.

SUMMARY

Accordingly, the present inventive concept has been made keeping in mind the above problems occurring in the prior art, and an object of the present inventive concept is to provide a system for controlling a transport of a heavy load by which a heavy load can be smoothly transported without causing interferences or collisions by controlling movement of the heavy load according to a facility around a road or a peripheral environmental condition in a process of transporting the heavy load by using a vehicle in a bridge, a tunnel, a rotation section, a curved section, an inclined contour, and the like, a transport vehicle, and a method of controlling transport of a heavy load.

Another object of the present inventive concept is to provide a system for controlling a transport of a heavy load by which a possibility of collision with facilities on the front and lateral sides of a transport vehicle can be detected in advance by mounting sensors at locations of a heavy load and the transport vehicle and a position of a rotor blade can be adjusted, so that transport speed of the transport vehicle can be further improved, a transport vehicle, and a method of controlling transport of a heavy load.

Another object of the present inventive concept is to provide a system for controlling a transport of a heavy load by which a height of a rotor blade can be adjusted by a height adjusting unit so that the rotor blade can be transported without connecting a separate support unit for supporting the rotor blade to a transport vehicle, and without a road reinforcement for ensuring an internal radius of rotation during rotation of a transport vehicle and in a curved section, movement of an obstacle such as an electric pole, a street tree, a traffic sign, and the like for ensuring an external radius of the transport vehicle, or a restoration operation, a transport vehicle, and a method of controlling transport of a heavy load.

Another object of the present inventive concept is to provide a system for controlling a transport of a heavy load by which a rotor blade can be rotated and moved upward, downward, leftward, and rightward according to a peripheral condition by an adapter having a simple structure, a transport vehicle, and a method of controlling transport of a heavy load.

In accordance with an aspect of an exemplary embodiment, there is provided a system for controlling transport of a heavy load by using a transport vehicle, the system including: an adjusting unit for controlling rotation, or upward, downward, leftward, and rightward movements of the heavy load so that collision or interference of the heavy load with a facility around a road or a peripheral environmental condition is prevented in a process of transporting the heavy load after the heavy load is fixedly mounted to the transport vehicle.

In accordance with an aspect of another exemplary embodiment, there is provided a method of controlling transport of a heavy load, the method including: detecting a peripheral area of a transport vehicle that transports the heavy load, by at least one sensor; determining whether the transport vehicle can pass through the peripheral area by comparing a detected value with a value set in advance by a controller; and if it is determined that the transport vehicle can pass through the peripheral area, adjusting movements of the heavy load according to a speed of the transport vehicle, a distance from a facility, a relative position of the transport vehicle to the facility, and an inclination of a road.

BRIEF DESCRIPTION OF THE DRAWINGS

The above and/or other objects, features and other advantages of the present inventive concepts will be more clearly understood from the following detailed description of exemplary embodiments, taken in conjunction with the accompanying drawings of which.

DETAILED DESCRIPTION

Hereinafter, exemplary embodiments will be described in detail with reference to the accompanying drawings. However, the present inventive concept is not limited by the exemplary embodiments.

Figure 1:
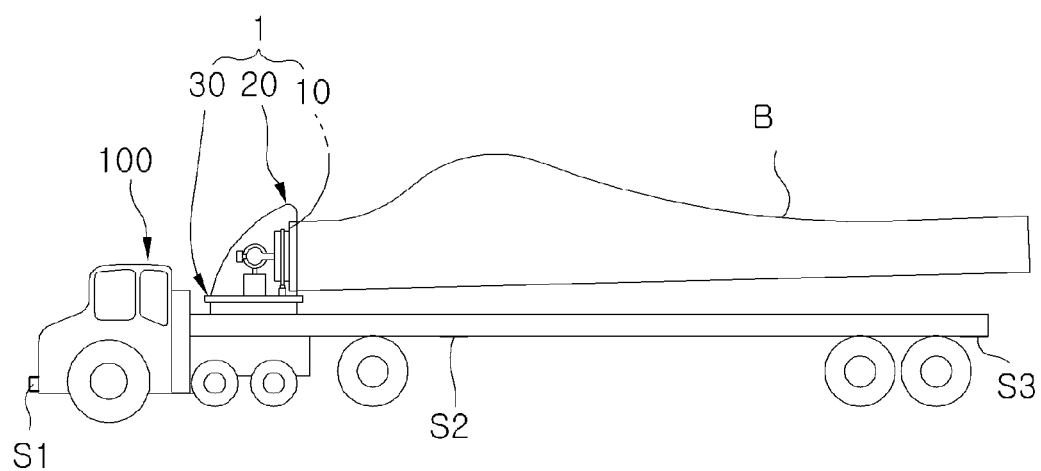
FIG. 1 is a schematic view showing a transport vehicle employing a transport control system according to an exemplary embodiment.
Figure 2:
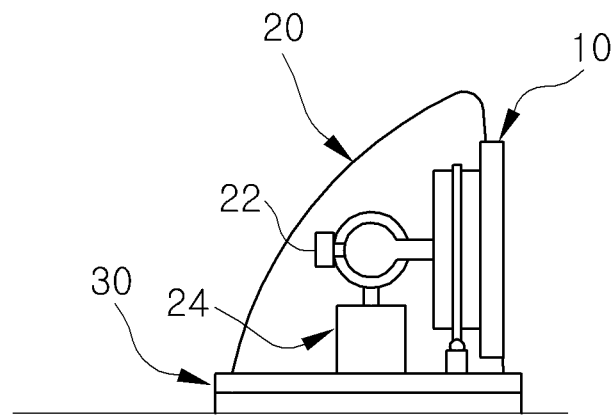
FIG. 2 is a schematic enlarged view showing an adjusting unit of FIG. 1 according to an exemplary embodiment.
Figure 3:
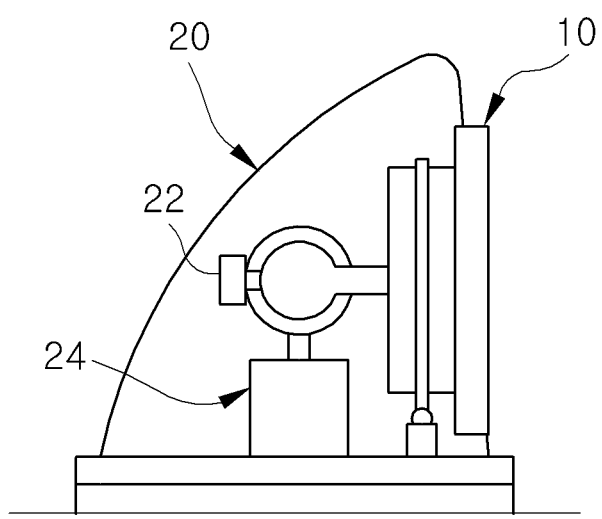
FIG. 3 is a schematic view showing an adapter of FIG. 2 according to an exemplary embodiment.
Figure 4:
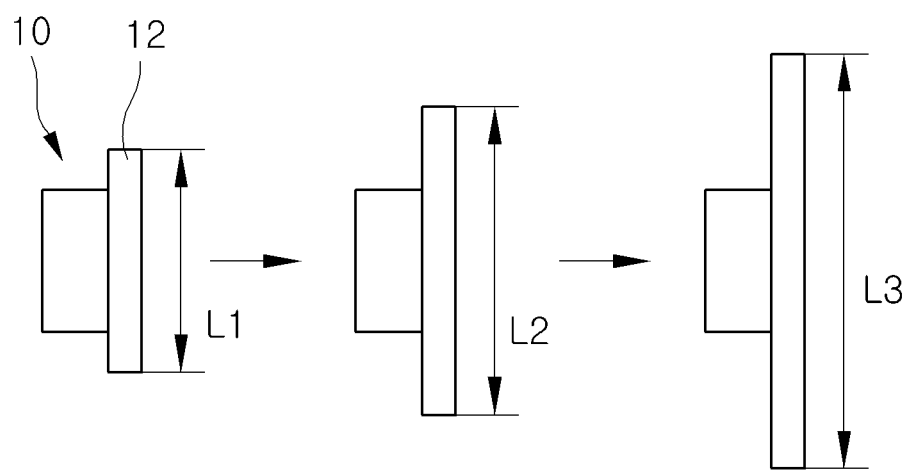
FIG. 4 is a schematic view showing a clamping member of FIG. 3 with different sizes according to an exemplary embodiment.

FIG. 1 is a schematic view showing a transport vehicle 100 employing a transport control system according to an exemplary embodiment. FIG. 2 is a schematic enlarged view showing an adjusting unit 1 of FIG. 1 according to an exemplary embodiment. FIG. 3 is a schematic view showing an adapter 20 of FIG. 2 according to an exemplary embodiment. FIG. 4 is a schematic view showing a clamping member 10 of FIG. 3 with different sizes according to an exemplary embodiment.

As shown in the drawings, a transport control system for transporting a heavy load by using a transport vehicle 100 is provided. The heavy load includes a rotor blade B of a wind power generator having a length of several to several ten meters and a weight of several to several ten tons. It is preferable that the rotor blade B is mounted such that a mass center of the rotor blade B is located at a front side of the transport vehicle 100 so that the rotor blade B may be smoothly adjusted without colliding or interfering with a peripheral facility, a tree, other environmental conditions.

The transport control system according to the exemplary embodiment includes an adjusting unit 1 for controlling rotation, and upward, downward, leftward, and rightward movements of the heavy load (i.e. the rotor blade B) so that collision or interference with a facility around a road or a peripheral environmental condition can be prevented in the process of transporting the heavy load after the heavy load is fixedly mounted to the transport vehicle 100 through screw-coupling or pressing.

The adjusting unit 1 includes a clamping member 10 mounted to the transport vehicle 100 and to which a heavy load is fixedly mounted without being moved, an adapter 20 for adjusting rotation, and upward, downward, leftward, and rightward movements of the clamping member 10 according to a facility around a road or an environmental condition, and a turntable type rotation unit 30 for rotating the adapter 20. Since the rotation unit 30 includes a turntable rotated by a driving source and a power transmission unit, and a fixed table.

Referring to FIGS. 2 and 3, the adapter 20 includes a rotating member 22 for rotating the clamping member 10 to which the rotor blade B is fixedly mounted leftward or rightward by at least about 0 to 360° according to a facility around a road or a condition, and a moving member 24 for adjusting vertical and transverse widths and moving the clamping member 10 together with the rotating member 22.

The rotating member 22 is configured to rotate the rotor blade B fixedly mounted to the clamping member 10 by using a gear or a wheel that is a power transmission unit mounted to an inside, an outside, or one side of the clamping member 10, and a driving gear or a belt engaged with the gear and rotated by a driving source.

The moving member 24 is mounted by a link or a connecting member mounted to an inside, an outside, or one side of the rotating member 22 or the clamping member 10 and is configured to adjust the clamping member 10 upward, downward, leftward, or rightward by using any method such as gear engagement, sliding, or a hydraulic or pneumatic system.

One side of the clamping member 10 is fixedly mounted to the rotating member 22 by using a bolt or a bracket, and a clamping part 12 to which a heavy load is fixed by a bolt or a bracket is provided at an opposite end of the clamping member 10. At least one clamping member 10 having different sizes corresponding to the size of a heavy load to be transported is provided as shown in FIGS. 4(A)-4(C). That is, as the size or length of the rotor blade to be transported changes, the clamping members 10 having various sizes L1, L2, and L3, where L1<L2<L3, as shown in FIG. 4 are properly selected according to the size of the rotor blade to be transported and are firmly attached and fixed.

According to the exemplary embodiment, the rotor blade B mounted to the clamping member 10 is rotated or moved leftward, rightward, upward, and downward by the rotating member 22 and the moving member 24 of the adapter 20 of an adjusting unit 1 according to a facility of a road or a peripheral environmental condition and the adapter 20 also is rotated by the rotation unit 30 if necessary in the process of transporting the rotor blade B that is a heavy load mounted to the transport vehicle 100. Thus, a condition in which the heavy load can be easily transported without colliding or interfering with the road facility or the peripheral environment is achieved.

Accordingly, transport efficiency can be maximized due to a condition in which delay can be minimized and transport time can be remarkably shortened by the adjusting unit, that is, the adapter and the rotation unit in the process of transporting the rotor blade that is a heavy load by using the transport vehicle.

The rotation or upward, downward, leftward, and rightward movements of adapter 20 may be manually or automatically adjusted.

That is, the adapter 20 is manually adjusted by an operator using a control panel provided in the transport vehicle 100 and including a lever or a button while the operator identifies a facility around a road or a periphery environmental condition by naked eyes. The lever or button of the control panel and the driving source connected to the rotating member 22 or the moving member 24 of the adapter 20 and the rotation unit 30 may be manipulated by a general method.

Accordingly, since the operator manipulates the adapter 20 that is an adjusting unit 1 and the rotation unit 30 through the control board provided in the transport vehicle 100 while directly identifying the adapter 20 and the rotation unit 30 by naked eyes, the heavy load can be safely and accurately transported without interrupting the transport of the heavy load.

Referring back to FIG. 1, the adapter 20 is automatically adjusted by at least one sensor S1, S2, S3, ... of the transport vehicle 10, such as a general distance measurement sensor for detecting a peripheral area of the transport vehicle 100, a position detection sensor, a weight sensor, and a posture detection sensor, and a controller (not shown) for comparing a detection value of the sensor with a preset value to adjust movement of the adapter 20 according to detection of the sensor and performing a control to correct a position of the adapter 20 according to a control method. The sensor may include an infrared ray sensor, an ultrasonic sensor, a laser sensor, a gyro sensor, an inertia sensor, and a GPS sensor according to applications thereof. A camera, an image sensor, and an image acquisition sensor may be employed so that the driver or server manager can identify a road situation in real time during travel of the transport vehicle.

Collision or interference of the rotor blade B can be minimized more effectively and efficiently by automatically adjusting the adapter 20 and the rotation unit 30 according to a road facility or a condition while the driver drives the transport vehicle 100.

Figure 5:
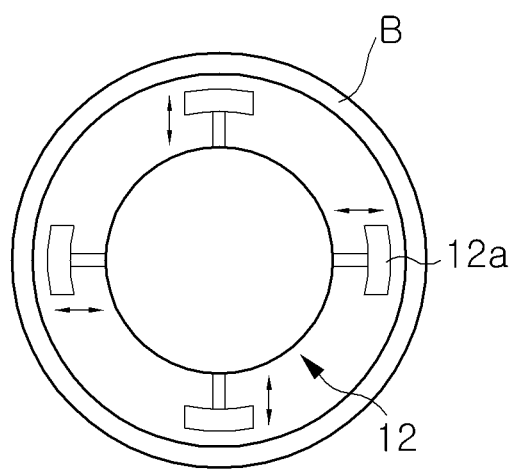
FIG. 5 is a view showing another embodiment of a clamping part of the clamping member of FIG. 4 according to an exemplary embodiment.
Figure 6:
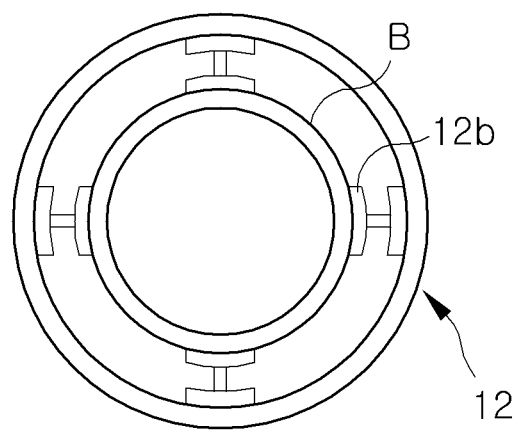
FIG. 6 is a view showing another embodiment of a clamping part of the clamping member of FIG. 4 according to an exemplary embodiment.

FIG. 5 is a view showing an exemplary embodiment of a clamping part 12 of the clamping member 10 of FIG. 4 according to an exemplary embodiment. FIG. 6 is a view showing another exemplary embodiment of a clamping part 12 of the clamping member 10 of FIG. 4 according to an exemplary embodiment.

As shown in FIG. 5, the clamping part 12 for fixing one end of the rotor blade B that is a heavy load of the clamping member 10 fixes the rotor blade B through pressing instead of screwing or bolting.

The clamping part 12 includes an inner clamp 12a that supports an inner surface of the rotor blade B that is a heavy load while contracting or expanding by a driving unit such as a hydraulic, pneumatic, or geared motor or cylinder through a gearing, linking, or sliding method. At least two to six inner clamps may be contracted or expanded at the same time.

That is, the inner clamp 12a firmly fixes the inner surface of the rotor blade B to prevent separation of the rotor blade B by expanding according to an operation of the driving unit after contracting, so that the rotor blade B can be simply and conveniently fixed as compared with screwing or bolting.

The clamping part 12 includes an outer clamp 12b that supports and fixes an outer surface of the rotor blade B that is a heavy load while contracting or expanding according to the operation of the driving unit as shown in FIG. 6 instead of supporting and fixing an inner surface of the rotor blade that is a heavy load as shown in FIG. 5.

In other words, the outer clamp contracts or expands from an outer surface of the heavy load unlike the inner clamp to support and fix the outer surface of the rotor blade, so that the heavy load can be supported and fixed stably as compared with the case of supporting and fixing the inside of the rotor blade in the process of adjusting movement of the rotor blade.

Figure 7:
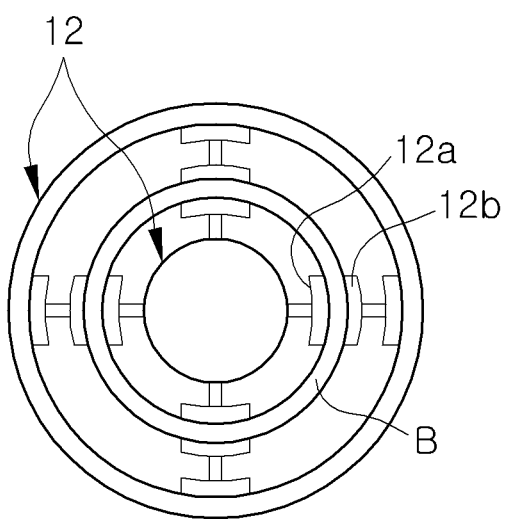
FIG. 7 is a view showing another embodiment of a clamping part of the clamping member of FIG. 4 according to an exemplary embodiment.

FIG. 7 is a view showing yet another embodiment of a clamping part 12 of the clamping member 10 of FIG. 4 according to an exemplary embodiment. As shown in FIG. 7, the clamping part 12 may be configured such that the inner and outer surfaces of the rotor blade B that is a heavy load are supported and fixed at the same time by the inner and outer clamps 12a and 12b that contracts or expands at the same time according to the operation of the driving unit as shown in FIGS. 5 and 6.

Since the rotor blade can be stably adjusted without being shattered or separated when the rotor blade is rotated or moved upward, downward, leftward, or rightward after being fixed by clamping the inner and outer surfaces of the rotor blade that is a heavy load at the same time, safety and stability can be maximally secured.

Figure 8:
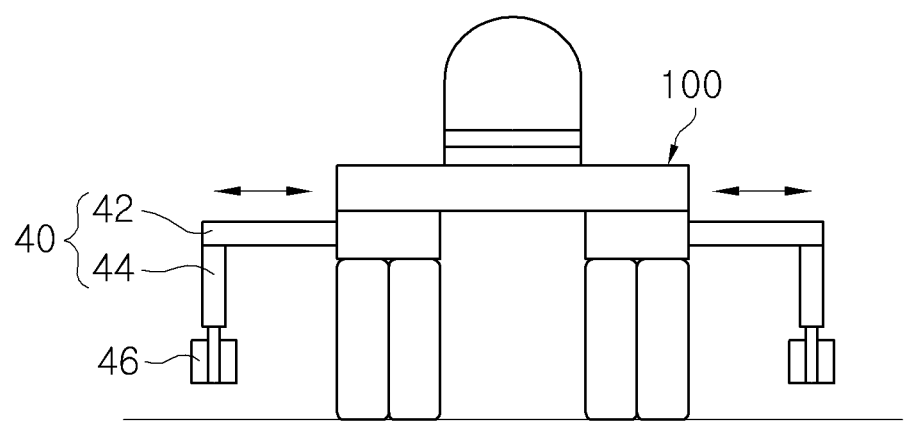
FIG. 8 is a schematic view showing a transport vehicle according to an exemplary embodiment.

FIG. 8 is a schematic view showing a transport vehicle 100 according to an exemplary embodiment.

As shown in FIG. 8, the transport vehicle 100 prevents a gravity center of a heavy load or the transport vehicle from deviating in the process of transporting the heavy load so that the transport vehicle 100 cannot be leaned and turned over to one side.

At least one turnover prevention unit 40 for preventing the transport vehicle 100 from being turned over leftward or rightward while contracting or expanding by using an operation unit (not shown) such as a button or a switch is provided at opposite side surfaces of the transport vehicle 100 at peripheries of the driver's seat of the transport vehicle.

The turnover prevention unit 40 includes a horizontal member 42 that contracts or expands according to an operation of the operation unit, and a vertical member 44 vertically provided at end of the horizontal member 42. Then, a general roller or wheel 46 is rotatably provided at a bottom end of the vertical member 44.

That is, the turnover prevention unit 40 remains contracted while travelling a linear section, and the operation unit of the turnover prevention unit is operated by a driver in advance in a curved section, when the adapter 20 or the rotation unit 30, by which the rotor blade is adjusted, is moved by the adjusting unit 1 or when there is a danger of the transport vehicle 100 deviating from the gravity center and turning over.

Accordingly, since the horizontal member 42 expands and the vertical member 44 formed at an end of the horizontal member 42 is supported by the ground surface, the transport vehicle 100 can be prevented from being turned over even when the gravity center of the transport vehicle 100 or the heavy load is leaned, making it possible to secure safety.

Figure 9:
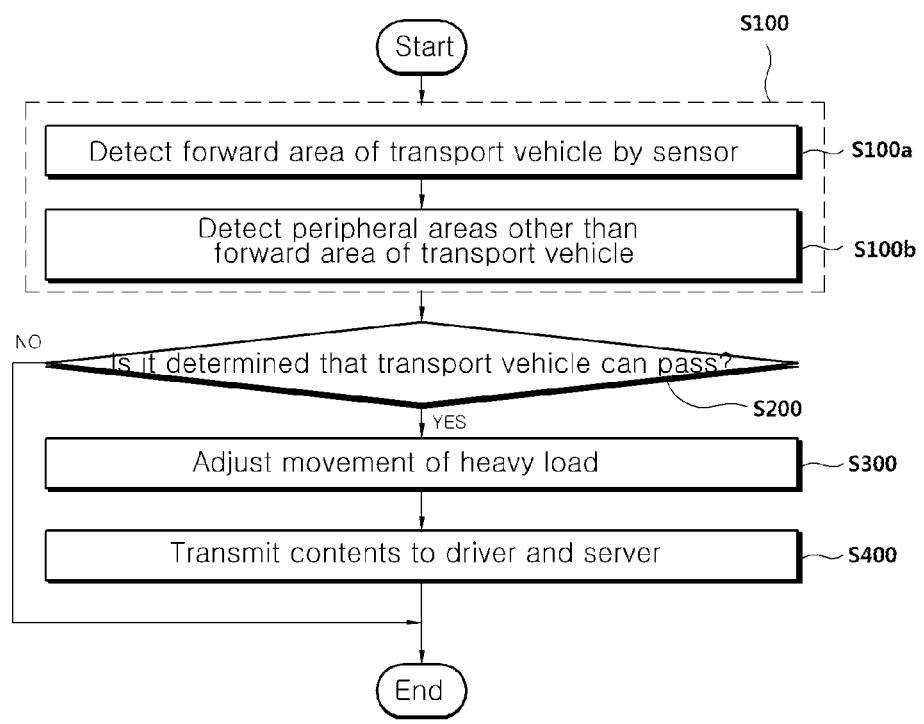
FIG. 9 is a flowchart showing a method of controlling transport of a heavy load according to an exemplary embodiment.

FIG. 9 is a flowchart showing a method of controlling transport of a heavy load according to an exemplary embodiment.

As shown in the drawing, the control method that uses a controller for transporting a heavy load according to the exemplary embodiment includes a step S100 of detecting a peripheral area of a transport vehicle 100 that transports a heavy load by at least one sensor S1, S2, S3 . . . mounted to a forward side and lateral sides of the transport vehicle or mounted to the heavy load to be transported. The detecting step includes detecting a posture of the transport vehicle 100 by using a posture detection sensor.

In the detecting step, a height of a facility such as a bridge or a tunnel in front of the transport vehicle or an inclination of a road is measured by using a front sensor mounted to a front surface of the transport vehicle (S100a). The inclination of the road may be measured more accurately by using a posture detection sensor together with the front sensor. Further, in the detecting step, a facility such as a traffic sign and a building installed around a road is detected by using side sensors mounted to side surfaces of the transport vehicle and a rear sensor (S100b). Further, a radius of rotation of the transport vehicle 100 for a curved road is determined by using an image from a camera sensor, an image sensor, and an image acquisition sensor in addition to at least one sensor of the controller.

The values measured by the at least one sensor S1, S2, S3 . . . are compared with values preset by the controller, and the controller performs a step S200 of determining whether the transport vehicle can pass through the facility by using the values measured by the sensor.

If it is determined that the transport vehicle can pass through the facility around the road, the controller adjusts rotation of the adapter 20 and a height and a width of the adapter 20 by using a relative position of the transport vehicle 100 to the facility, an inclination of the road, and a radius of rotation of the transport vehicle 100 (S300), and transmits the contents to the driver and the server (S400). If it is determined that the transport vehicle 100 cannot pass through the facility around the road, the contents are transmitted to the driver and the server.

Accordingly, the method can improve transport speed by detecting a possibility of collision with facilities on the front and lateral sides of the transport vehicle 100 by using the sensors mounted to the heavy load and the transport vehicle 100 in advance, and by adjusting a position of the rotor blade B by using the detected values.

An adjusting unit according to exemplary embodiments will be described in detail with reference to FIGS. 10 to 13.

The adjusting unit according to an exemplary embodiment is provided in the transport vehicle 100 for transporting a heavy load or is mounted to the transport vehicle 100 as separate equipment. The heavy load includes a rotor blade B of a wind power generator having a length of several to several ten meters and a weight of several to several ten tons. It is preferable that the rotor blade B is mounted such that a mass center of the rotor blade B is located at a front side of the transport vehicle 100 so that the rotor blade B can be smoothly moved while avoiding a facility around the transport vehicle 100.

The adjusting unit includes a sensor module 50 for detecting a peripheral area of a road on which the transport vehicle 100 travels, a height adjusting unit 62, a width adjusting unit 64, and a control unit 60.

The sensor module 50 detects a peripheral area of the transport vehicle 100 to determine whether the transport vehicle 100 that transports the rotor blade B can pass through a road, for example, whether the transport vehicle 100 can pass through a bridge, whether the transport vehicle 100 can pass through an inclined road, whether the transport vehicle 100 may collide with peripheral facilities (a building, a traffic signs, and the like) of the road, and a radius of rotation of a curved road. Thus, the sensor module 50 is mounted to a forward side and lateral sides of the transport vehicle 100, or the rotor blade B.

The sensor module 50 includes a first sensor 52 mounted to a forward side of the transport vehicle 100, a second sensor 54 for detecting a peripheral area other than the forward side of the transport vehicle 100, and a posture detection sensor 56 for detecting a posture of the transport vehicle 100. In this case, it is preferable that the posture detection sensor 56 for detecting a posture of the transport vehicle 100 is provided in the transport vehicle 100. The value detected by the posture detection sensor 56 is compared with a value set by a posture control unit (not shown) provided in the transport vehicle 100 or the control unit 60 in advance and is used to control a posture of the transport vehicle 100.

The sensor module 50 includes a distance measurement sensor for measuring a relative position of the transport vehicle 100 to a specific location around the transport vehicle 100 or a facility, a position detection sensor for recognizing a position of the transport vehicle 100 on a road, and a posture detection sensor for detecting a posture of the transport vehicle 100. The sensor module 50 may include an infrared ray sensor, an ultrasonic sensor, a laser sensor, a gyro sensor, an inertia sensor, and a GPS sensor according to a purpose thereof. The sensor module 50 may employ a camera, an image sensor, and an image acquisition sensor if necessary to allow a driver or a server manager to identify a road situation in real time when the transport vehicle 100 is driven.

The height adjusting unit 62 adjusts a height of the rotor blade B of the transport vehicle 100 according to detection of the sensor module 50. The control unit 60 compares a value detected by the sensor module 50 with a preset value to allow the height adjusting unit 62 to adjust a height of the rotor blade B. For example, the sensor module 50 measures a height of a facility such as a bridge or a tunnel by using a first sensor 52 mounted to a front side of the transport vehicle 100 while the transport vehicle 100 is driven, and the control unit 60 determines whether the transport vehicle 100 can pass through the facility by comparing the measured value and a reference value. When it is determined that the transport vehicle 100 can pass through the facility, the height adjusting unit 62 adjusts a height of the rotor blade B to allow the transport vehicle 100 to pass through the facility such as a bridge or a tunnel.

Figure 11:
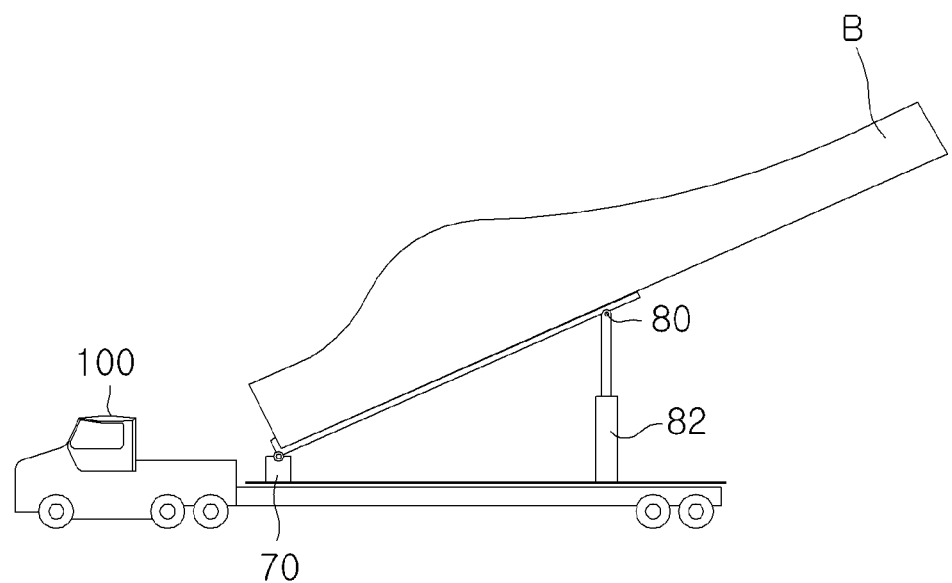
FIG. 11 is a schematic view showing a transport vehicle employing a transport control system according to an exemplary embodiment.
Figure 12:
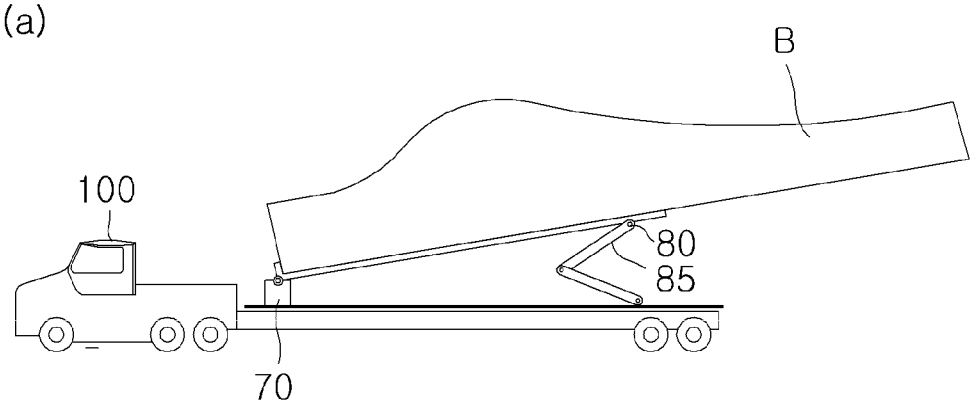
FIG. 12 is a schematic view showing an adjusting unit according to an exemplary embodiment.
Figure 12:
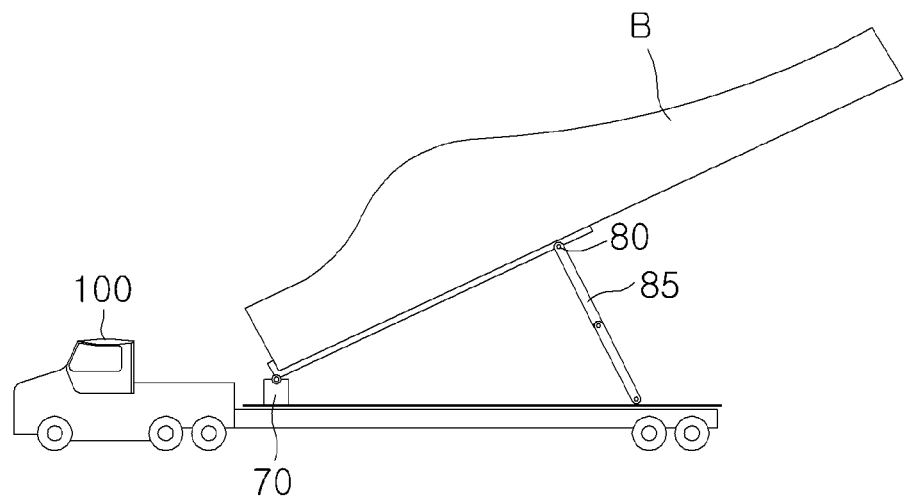
Figure 13:
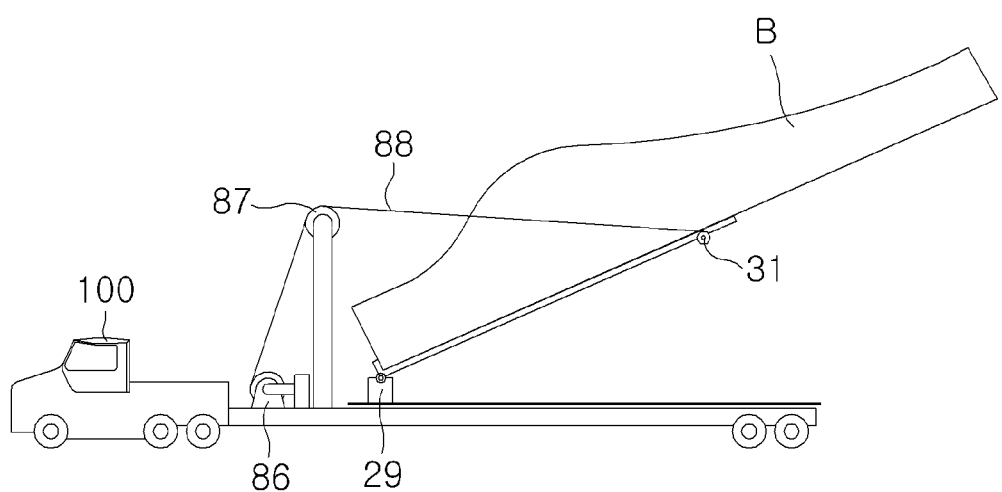
FIG. 13 is a schematic view showing an adjusting unit according to an exemplary embodiment.

The height adjusting unit 62 fixes a first position 70 of the rotor blade B, and adjusts a height of the rotor blade B by changing a coordinate of a second position 80 different from the first position 70. As shown in FIGS. 11 to 13, the height adjusting unit 62 may adjust a height of the heavy load by using a hydraulic cylinder 82, by using at least one support 85 in a foldable manner, or by using a motor 86, a pulley 87, and a tensile cable 88, but another type of adjusting unit that can support a size and a weight of the heavy load may be used.

The width adjusting unit 64 adjusts a width of the heavy load according to detection of the sensor module 50. The control unit 60 measures a relative position of the transport vehicle 100 to a facility around a road on which the transport vehicle 100 travels from the values detected by the first sensor 52 and the second sensor 54, and determines whether the transport vehicle 100 can pass through the facility by compared the measured value with a preset value. When determining that the transport vehicle 100 can pass, the control unit 21 controls the width adjusting unit 64 to adjust the width of the heavy load. The width adjusting unit 64 adjusts a width of the rotor blade B by rotating the rotor blade B by using a hydraulic cylinder 82, or by using a motor 86, a pulley 87, and a tensile cable 88.

If it is determined that the transport vehicle 100 can avoid a facility around a road by using the height adjusting unit 62 and the width adjusting unit 64, the control unit 60 informs the driver of the contents, and if it is determined that the rotor blade B cannot pass through the facility around the road even if the height adjusting unit 62 and the width adjusting unit 64 are used, the control unit 60 transmits the contents to the driver and the server. As a result, the transport control system according to the exemplary embodiment can remarkably improve transport efficiency of the heavy load by processing information on the road and the peripheral facility in real time by using the control unit 60.

Figure 14:
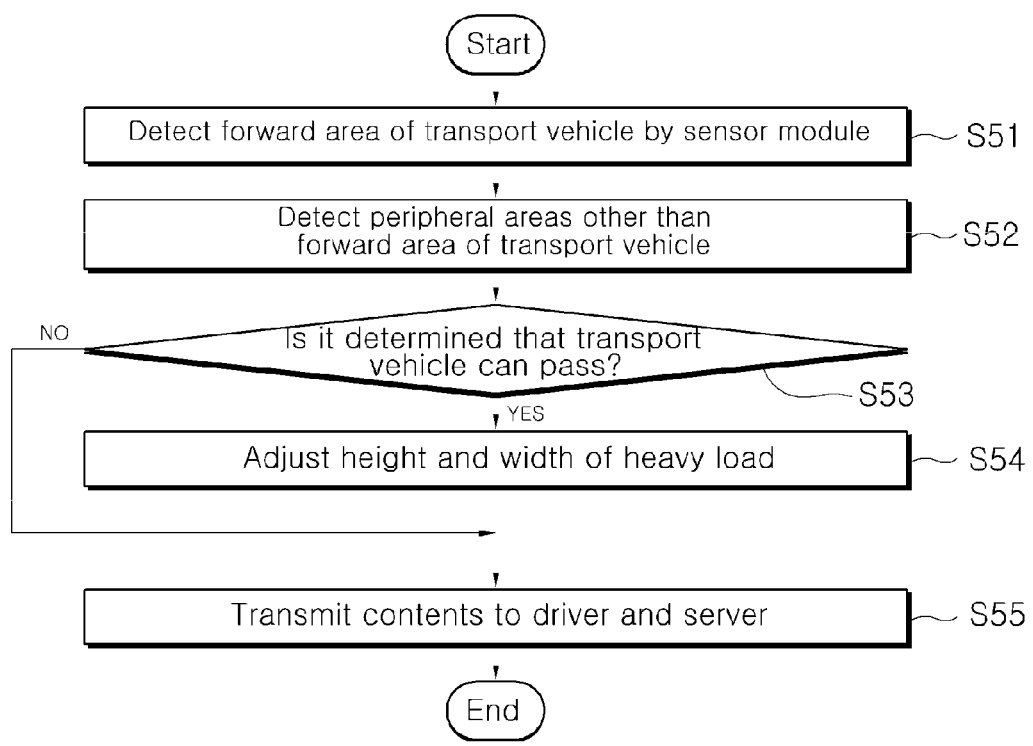
FIG. 14 is a flowchart showing a method of controlling transport of a heavy load according to an exemplary embodiment.

Hereinafter, the method of controlling transport of a heavy load according to exemplary embodiments will be described in detail with reference to FIGS. 10 and 14. FIG. 14 is a flowchart showing a method of controlling transport of a heavy load according to an exemplary embodiment.

Figure 10:
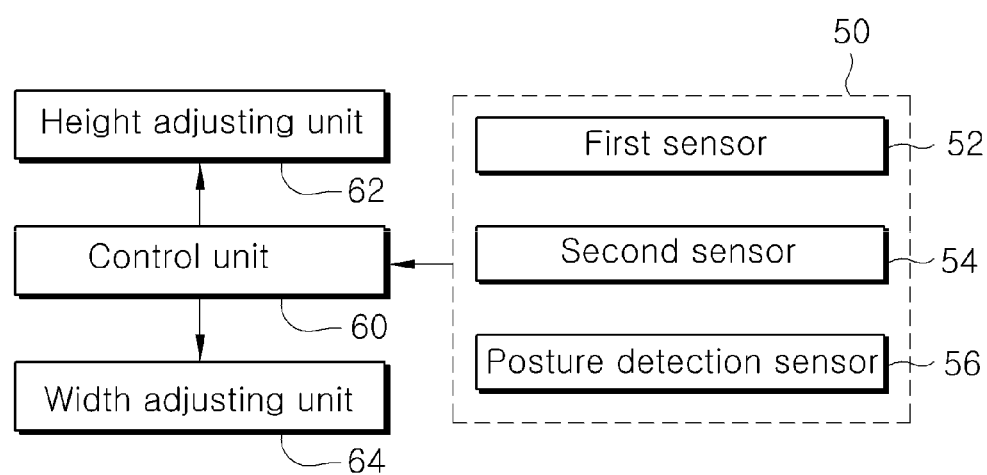
FIG. 10 is a block diagram showing an adjusting unit according to an exemplary embodiment.

Referring to FIGS. 10 and 14, the method of controlling transport of a heavy load according to the exemplary embodiment includes detecting a peripheral area of the transport vehicle 100 by using the sensor module 50 mounted to a forward side and lateral sides of the transport vehicle 100 or mounted to a heavy load to be transported (S51 and S52). The detecting step includes detecting a posture of the transport vehicle 100 by using a posture detection sensor 56.

In step S52, a height of a facility such as a bridge or a tunnel on the front side of the transport vehicle 100 is measured or an inclination of a road is measured by using the first sensor 52 mounted to a front surface of the transport vehicle 100. The inclination of the road may be more accurately measured by using the posture detection sensor 56 together with the first sensor 52. In step S52, a facility such as a traffic sign or a building installed around the road is detected by using the second sensor 54 mounted to a side surface of the transport vehicle 100. A radius of rotation of the transport vehicle 100 on a curved road is determined by using an image acquired by a camera sensor, an image sensor, and an image acquisition sensor in addition to the first sensor 52 and the second sensor 54.

The values measured by the sensor module 50 is compared with values set by the control unit 60 in advance, and the control unit 60 determines whether the transport vehicle 100 can pass through the facility by using values measured by the sensor module 50 (S53).

In step S53, if it is determined that the transport vehicle 100 can pass through a facility around a road, the control unit 60 adjusts a height and a width of the rotor blade B by controlling the height adjusting unit 62 and the width adjusting unit 64 by using a speed of the transport vehicle 100, a distance from a facility, a relative position of the transport vehicle to the facility, an inclination of the road, and a radius of rotation of the transport vehicle 100 (S54), and transports the contents to the driver and the server. In step S53, if it is determined that the transport vehicle 100 cannot pass through the facility around a road, the control unit 60 transmits the contents to the driver and the server (S55).

As a result, the method can improve transport speed by detecting a possibility of collision with facilities on the front and lateral sides of the transport vehicle 100 by using the sensors mounted to the heavy load and the transport vehicle 100 in advance, and by adjusting a position of the rotor blade B by using the detected values.

According to the exemplary embodiments, a heavy load can be smoothly transported without causing interferences or collisions by controlling movement of the heavy load according to a facility around a road or a peripheral environmental condition in a process of transporting the heavy load by using a vehicle, so that the heavy load can be promptly and conveniently transported according to a road condition, making it possible to maximally increase transport efficiency.

Further, a possibility of collision with facilities on the front and lateral sides of a transport vehicle can be detected in advance by mounting sensors at locations of a heavy load and the transport vehicle and a position of a rotor blade can be adjusted, so that transport efficiency can be maximized by further improving transport speed.

Further, since a height of a rotor blade can be adjusted by a height adjusting unit, the rotor blade can be transported without connecting a separate support unit for supporting the rotor blade to a transport vehicle. Accordingly, the equipment can be simply configured and the rotor blade can be prevented from being damaged while being transported.

Further, since a rotor blade can be rotated, and be moved upward, downward, leftward, and rightward according to a peripheral condition by an adapter having a simple structure, it can be smoothly transported without collisions or interferences even in various road conditions without fixing several points of the heavy load.

While exemplary embodiments have been shown and described above, it would be appreciated by those skilled in the art that various changes may be made therein without departing from the principles and spirit of the present inventive concept, as defined by the following claims.

What is claimed is:

1. An apparatus for controlling transport of a heavy load on a transport vehicle, the apparatus comprising: an adjusting unit configured to adjust movements of the heavy load according to at least one of a speed of the transport vehicle, a distance from a facility, a relative position of the transport vehicle to the facility, and an inclination of a road in response to the apparatus determining that the transport vehicle is able to pass through a peripheral area of the transport vehicle wherein the adjusting unit comprises: a clamping member provided on the transport vehicle and configured to clamp the heavy load; a rotating member configured to rotate the clamping member; and a moving member configured to move the clamping member and the rotating member in a linear direction.

2. The apparatus of claim 1, wherein the adjusting unit further comprises:
   an adapter configured to adjust rotation, or upward, downward, leftward, and rightward movements of the clamping member; and
   a rotation unit configured to rotate the adapter.

3. The apparatus of claim 1, wherein one side of the clamping member is fixedly mounted to the rotating member and the clamping member comprises a clamping part provided at an opposite side of the one side of the clamping member and configured to clamp the heavy load.

4. The apparatus of claim 3, wherein at least one clamping member having a size corresponding to a size of the heavy load to be transported is provided.

5. The apparatus of claim 1, wherein the rotation or the linear movements of the adapter are manually or automatically adjusted.

6. The apparatus of claim 1 further comprising:
at least one sensor configured to detect a peripheral area of the transport vehicle; and
a controller configured to compare a detected value of the at least one sensor with a preset value and configured to correct a position of the adapter and adjust movements of the adapter according to detection of the sensor,
wherein at least one sensor and the controller is configured to perform automatic adjusting of the adapter.

7. The apparatus of claim 2, further comprising at least one turnover prevention unit provided on opposite side surfaces of the transport vehicle and configured to prevent the transport vehicle from being turned over leftward and rightward while contracting or expanding according to an operation of an operation unit.

8. The apparatus of claim 7, wherein the turnover prevention unit comprises:
a horizontal member configured to contract or expand according to the operation of the operation unit; and
a vertical member vertically provided at an end of the horizontal member.

9. The apparatus of claim 1, wherein the adjusting unit comprises:
a sensor module configured to detect a peripheral area of the transport vehicle;
a width adjusting unit configured to adjust a width of the heavy load according to the detection of the sensor module;
a height adjusting unit configured to adjust a height of the heavy load according to the detection of the sensor module; and
a control unit configured to compare a detection value of the sensor module with a value stored in advance and configured to control the width adjusting unit to correct a position of the heavy load.

10. The apparatus of claim 9, wherein the sensor module comprises:
a first sensor configured to detect a forward area of the transport vehicle in a running direction of the transport vehicle;
a second sensor configured to detect peripheral areas other than the forward area of the transport vehicle; and
a posture detection sensor configured to detect a posture of the transport vehicle.

11. The apparatus of claim 9, wherein the height adjusting unit is configured to fix a first position of the heavy load and change a coordinate of a second position different from the first position to adjust the height of the heavy load.

12. The apparatus of claim 11, wherein the height adjusting unit comprises at least one of a hydraulic cylinder, a motor, a pulley, a tensile cable, and at least one support.

13. The apparatus of claim 9, wherein the width adjusting unit comprises at least one of a motor, a gear, a hydraulic cylinder, a motor, a pulley, and a tensile cable.

14. A method of controlling transport of a heavy load, the method comprising:
detecting a peripheral area of a transport vehicle configured to transport the heavy load by at least one sensor;
determining whether the transport vehicle is able to pass through the peripheral area by comparing a detected value with a predetermined value by a controller; and
adjusting movements of the heavy load according to a speed of the transport vehicle, a distance from a facility, a relative position of the transport vehicle to the facility, and an inclination of a road in response to determining that the transport vehicle is able to pass through the peripheral area,
wherein the adjusting the movements comprises:
clamping, by a clamping member of an adjusting unit, the heavy load;
rotating, by a rotating member of the adjusting unit, the clamping member according to the determining whether the transport vehicle is able to pass; and
moving, by a moving member of the adjusting unit, the clamping member and the rotating member in a linear direction according to determining whether the transport vehicle is able to pass.

15. The method of claim 14, wherein the detecting of the peripheral area comprises:
detecting a forward area of the transport vehicle in a running direction of the transport vehicle by a front sensor provided at a front side of the transport vehicle;
detecting peripheral areas of the transport vehicle other than the forward area of the transport vehicle by side sensors and a rear sensor; and
detecting a posture of the transport vehicle by using a posture detection sensor.

16. The method of claim 14, wherein, in the determining of whether the transport vehicle is able to pass through the peripheral area comprises measuring and comparing the speed of the transport vehicle, the distance from a facility, the relative position between the facility and the transport vehicle, and the inclination of the road with the predetermined value.

17. The method of claim 14, wherein the adjusting of the movements of the heavy load is performed while the transport vehicle is being driven.

18. The method of claim 14, wherein, in response to the determining that the transport vehicle is able to pass through the peripheral area, a result of the determination is transmitted to a driver, and in response to the determining that the transport vehicle is not able to pass through the peripheral area, the result of the determination is transmitted to the driver and a server.

19. The apparatus of claim 1, wherein the moving member is configured to translate the clamping member and the rotating member simultaneously in the linear direction.

20. The method of claim 14, wherein the moving the clamping member and the rotating member comprises translating the clamping member and the rotating member simultaneously in the linear direction.

* * * * *